United States Patent
Eby et al.

(10) Patent No.: US 11,587,151 B1
(45) Date of Patent: *Feb. 21, 2023

(54) SEAMLESS USER RETAIL EXPERIENCE BASED ON LOCATION

(71) Applicant: WALGREEN CO., Deerfield, IL (US)

(72) Inventors: Nicholas L. Eby, Downers Grove, IL (US); Joseph M. Rago, Hinsdale, IL (US)

(73) Assignee: WALGREEN CO., Deerfield, IL (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/141,368

(22) Filed: Jan. 5, 2021

Related U.S. Application Data

(63) Continuation of application No. 16/182,323, filed on Nov. 6, 2018, now Pat. No. 10,929,919, which is a continuation of application No. 14/990,414, filed on Jan. 7, 2016, now Pat. No. 10,163,150.

(51) Int. Cl.
*G06Q 30/06* (2012.01)
*G06Q 30/0601* (2023.01)

(52) U.S. Cl.
CPC ..... *G06Q 30/0639* (2013.01); *G06Q 30/0601* (2013.01); *G06Q 30/0611* (2013.01); *G06Q 30/0613* (2013.01)

(58) Field of Classification Search
CPC ........... G06Q 30/0601; G06Q 30/0611; G06Q 30/0613
USPC ....................................................... 705/26.9
See application file for complete search history.

(56) References Cited

U.S. PATENT DOCUMENTS

| 6,587,835 B1 | 7/2003 | Treyz et al. |
| 7,711,600 B1 | 5/2010 | Curran et al. |
| 9,152,990 B1 | 10/2015 | Kanter et al. |
| 9,639,889 B2 | 5/2017 | Babiarz et al. |
| (Continued) | | |

FOREIGN PATENT DOCUMENTS

KR 20080088618 A * 10/2008 ............... G06F 3/12

OTHER PUBLICATIONS

Article, "Wall St. Cheat Sheet: 7 of the Worst Things About Online Advertising", Publication info: Weblog post. Newstex Finance & Accounting Blogs, Newstex. Dec. 10, 2015; retrieved from Dialog on Jul. 7, 2022 (Year: 2015).*

*Primary Examiner* — Yogesh C Garg
(74) *Attorney, Agent, or Firm* — Marshall, Gerstein & Borun LLP; Randall G. Rueth

(57) ABSTRACT

Techniques for providing a seamless user experience across electronic and physical retail stores of a retailer include storing, locally with a session corresponding to a user's visit to the retailer's electronic store, indications of items that were viewed and/or focused on by the user at the electronic store. At least some of said indications may be transferred to a centralized data storage of the retailer for persistence after the session is terminated. Subsequently, an electronic device operated by the user may determine its location and determine, based on its location, a particular physical retail store of the retailer. Via communications with one or more retailer servers, items that were recently viewed by the user at the electronic store may be identified, and indications thereof may be presented on the display of the electronic device in conjunction with information corresponding to the recently viewed items at the particular physical store.

20 Claims, 10 Drawing Sheets

(56) References Cited

U.S. PATENT DOCUMENTS

| | | |
|---|---|---|
| 2007/0077925 A1 | 4/2007 | Hiyama |
| 2008/0162305 A1 | 7/2008 | Rousso et al. |
| 2010/0088316 A1 | 4/2010 | Robinson et al. |
| 2013/0046869 A1 | 2/2013 | Jenkins et al. |
| 2013/0293530 A1 | 11/2013 | Perez et al. |
| 2014/0114758 A1* | 4/2014 | Bentley .............. G06Q 30/0277 705/14.53 |
| 2015/0026296 A1* | 1/2015 | Halpern ................. H04L 67/06 709/217 |
| 2015/0066707 A1* | 3/2015 | Unger ................ G06Q 30/0641 705/27.1 |
| 2015/0112826 A1 | 4/2015 | Crutchfield, Jr. |
| 2017/0083940 A1* | 3/2017 | Achan ................ G06Q 30/0277 |
| 2017/0186077 A1 | 6/2017 | Srinivasan et al. |
| 2018/0218388 A1* | 8/2018 | Han ................... G06Q 30/0242 |

\* cited by examiner

SEAMLESS USER RETAIL EXPERIENCE BASED ON LOCATION

CROSS-REFERENCE TO RELATED APPLICATIONS

This application is a continuation of U.S. patent application Ser. No. 16/182,323, filed on Nov. 6, 2018 and entitled "Seamless User Retail Experience Based on Location," which is a continuation of U.S. patent application Ser. No. 14/990,414, filed on Jan. 7, 2016, entitled "Seamless User Retail Experience Based On Location" and issued as U.S. Pat. No. 10,163,150, the disclosures of which are hereby incorporated herein by reference in its entirety for all purposes.

TECHNICAL FIELD

This application generally relates to enhancing a retail experience for a customer. In particular, this application relates to seamlessly maintaining a customer's retail experience as the customer moves between electronic and physical retail locations of a retailer.

BACKGROUND

Portable electronic devices such as smart phones and tablet devices are becoming more ubiquitous as underlying technology and device capability improves. These devices incorporate numerous components that support various device functions and applications. For example, current smart phones include components that enable network connections as well as location modules capable of detecting device location.

Certain technologies exist to assist individuals during a retail shopping experience. For example, individuals may maintain account information using device applications, and complete point of sale transactions using device hardware (e.g., near field communication technology).

Additionally, many retailers now provide, own, operate, and/or include both physical retail store locations as well as electronic retail stores, such as a website at which a customer may browse, select, and purchase items.

Thus, there is an opportunity to provide customers with a seamless customer experience as the customer moves between an electronic retail store and physical retail store locations provided by a retailer.

SUMMARY

In one embodiment, a computer-implemented method in an electronic device for providing a seamless retail experience is provided. The method may include initiating, by a processor, the execution of an application on the electronic device. The application may be associated with the user and with a retailer that has at least one physical retail store and an electronic retail store. The method may further include determining, by the processor, a location of the electronic device based on one or more sensors of the electronic device, e.g., based on information detected by the one or more sensors. Additionally, the method may include displaying, on an interface associated with the electronic device and with the application, an indication of at least one product that was previously viewed by the user at the electronic retail store of the retailer, and displaying, on the interface, information particular to the at least one product at a physical retail store of the retailer, where the physical retail store corresponds to the location of electronic device.

In another embodiment, an electronic device may be provided. The electronic device may include one or more transceivers configured to connect (e.g., to communicatively connect) with one or more servers associated with a retailer. The retailer may have at least one physical retail store and an electronic retail store. The electronic device may also include a user interface configured to display content, one or more sensors configured to determine, detect, or sense information indicative of the location of electronic device, and a memory storing an application that is electronically associated with the retailer and with a user. Additionally, the electronic device may include a processor interfacing with the one or more transceivers, the user interface, the one or more sensors, and the memory. The processor may be configured to initiate the application associated with the retailer and the user, and determine, based on information determined by the one or more sensors, an identity of a physical retail store of the retailer corresponding to the location of electronic device. The processor may be further configured to cause the user interface to, via the application, display an indication of at least one product that has been previously viewed by the user at the electronic retail store of the retailer, and display information that is particular to both the at least one product and the physical retail store of the retailer.

In another embodiment, a system may be provided. The system may include one or more data storage devices storing information corresponding to one or more user accounts associated with a retailer. The system may also include a communication interface to an electronic retail store of the retailer, one or more communication interfaces to one or more physical retail stores of the retailer, and a communicative interface to an application executing on electronic device, where the executing application corresponds to the retailer and to an account of a user. Additionally, the system may include one or more processors that interface with the one or more data storage devices, the electronic retail store communication interface, the one or more physical retail store communication interfaces, and the user application communication interface. The one or processors may be configured to receive, from the application, an indication of a location of electronic device and an indication of the user; obtain, from the one or more data storage devices, an indication of one or more products that were previously viewed by the user at the electronic retail store; and obtain, from the one or more data storage devices, information corresponding to the previously viewed one or more products and particular to physical retail store, where said information is at least partly determined based on the location of electronic device. The one or more processors may be further configured to transmit the obtained information to the application for display on a user interface of the electronic device, e.g. via the executing application.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1A:
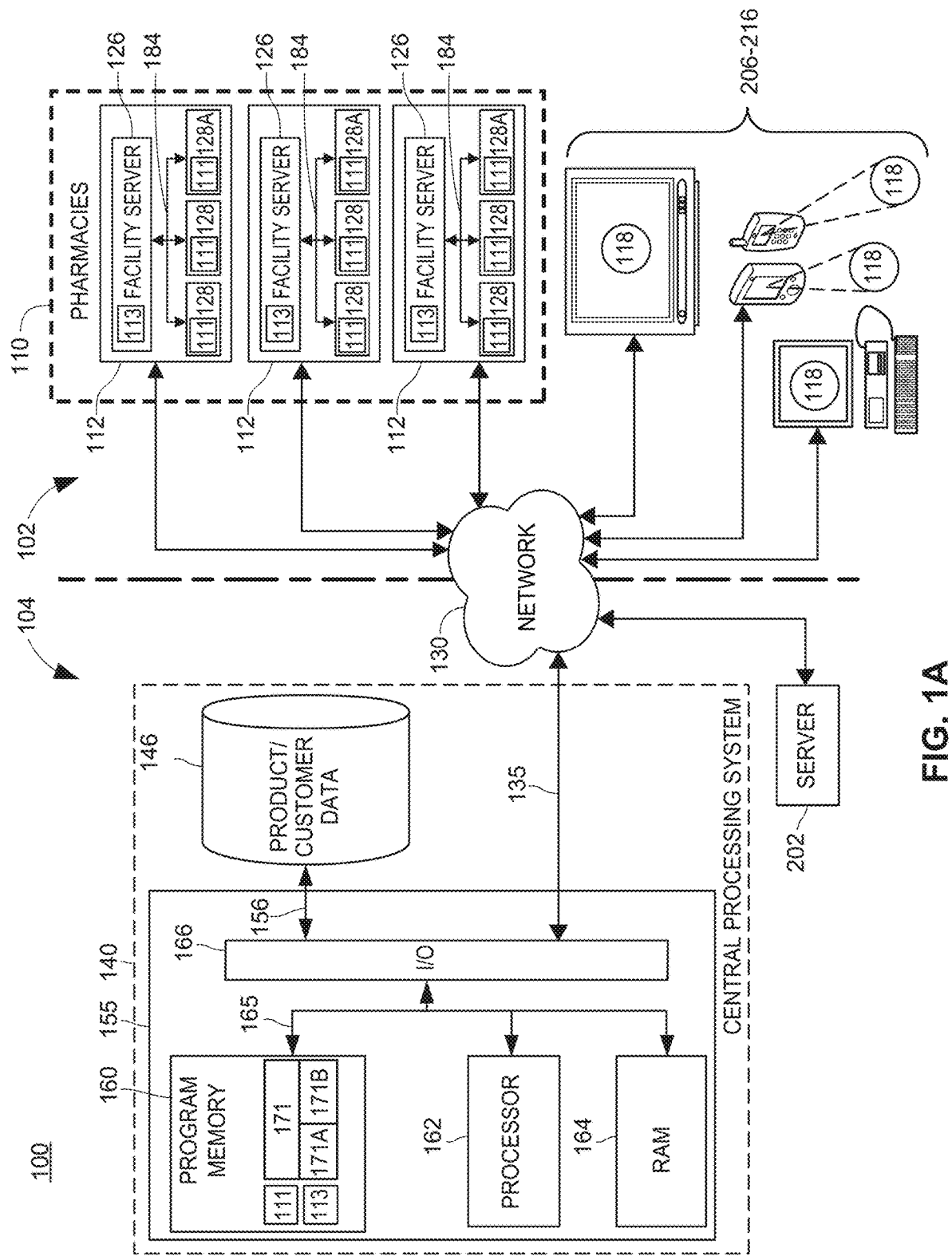
FIGS. 1A-1D illustrate various front end and back end devices and components of an example system for providing a seamless user experience corresponding to a retailer, and connections therebetween, in accordance with some embodiments.

The systems and methods disclosed here relate generally to providing a seamless retail shopping experience for customers as the customers move between an electronic retail store and a physical retail store operated by a retailer. According to certain aspects, the systems and methods may leverage communications and other hardware and software capabilities of electronic devices to facilitate a seamless retail experience across multiple stores of the retailer, and may automatically and dynamically provide relevant information to the customers.

According to embodiments, a customer may utilize an electronic computing device to access or visit an electronic retail store of a retailer, e.g., by accessing a website provided by the retailer. For example, a browser or other application executing on the electronic computing device operated by the customer may establish a session with the retailer's website via one or more data communication networks. The retailer's website may be hosted on one or more servers associated with the retailer (e.g., one or more back end servers). The electronic device via which the user accesses the retailer's electronic store may be any desired electronic device, such as a home computer, a work computer, a public computer (e.g., a library computer), and/or a mobile or portable electronic device (e.g., phone, smart device, tablet, laptop, etc.).

At the retailer's electronic store, the customer or user may browse or search for products and/or services, select various items, view details of items, save items to a wish list, save items to a shopping cart, and/or purchase items and arrange for their pickup or delivery, etc. Products and/or services that the user views and/or focuses on during his or her visit at the electronic retail store but does not purchase are generally referred to herein as Recently Viewed Items or "RVIs". For example, a user's RVIs for a particular visit to the retailer's electronic store may include items for which the user has entered search terms; items that the user has clicked on or otherwise selected (e.g., to view additional details); and/or items that have otherwise been the target of the user's focus (e.g., focus events) during his or her visit at the retailer's electronic store. Indications of RVIs corresponding to the user's visit may be stored locally in conjunction with the corresponding session, e.g., in a local cookie associated with the session.

In some scenarios, the user may have an account with the retailer. Generally, a user's account with the retailer may be indicated by an identifier, such as an account number, a username/password combination, etc. The user's account with the retailer may be associated with, inter alia, information generated as a result of the user's visits to the electronic retail store, and access to the user's account may be secured (e.g., may require authentication and/or authorization). Other information associated with the user's account may include information provided by the user such as a login and/or password, email address, shipping addresses, payment methods, phone number, etc., and may also include information related to the user's shopping experiences and/or history at the retailer's electronic retail store (e.g., wish lists, orders placed, orders fulfilled, receipts, etc.).

When a user logs out of his or her account, and/or when the browser or application via which the user accessed the electronic retail store is closed or terminated, the session between the browser/application and the retailer's electronic retail store may be ended, torn down, or terminated. As part of the session termination process, information related to the user's visit at the electronic store during the session may be transferred to the retailer's servers for storage in a centralized or global memory. For example, information indicative of updates to the user's account during the session such as password updates, added shipping addresses, new orders and/or purchases, etc. may be transmitted to the back-end servers of the retailer for storage in a centralized memory. In particular, indications of items that were recently viewed during the session (e.g., RVIs of the session) may be transmitted to the retailer's servers for storage in the centralized or global memory in conjunction with the user's account. For example, the RVIs of the session may be stored in a global cookie or other similar storage entity associated with the user's account at the retailer's servers.

In addition to the electronic retail store, the retailer may own, operate, and/or otherwise be associated with a chain of physical retail stores (e.g., multiple physical retail stores). Further, the retailer may provide an application which may be downloaded to a user's mobile or portable electronic device to supplement and/or aid the user's retail experiences while he or she visits the retailer's physical retail stores. Such an application is generally referred to herein as a "retailer client application," and access to the retailer client application executing on the user's mobile electronic device may be secured (e.g., may require authentication and/or authorization). The retailer client application may be capable of facilitating features that enable user to view items corresponding to the physical retail store, make various selections, and/or control operation of the features to supplement and/or aid the user's retail experiences. For example, the retailer client application may store a user's rewards or frequent buyer card number and/or other user-specific information such as preferred physical store location and/or pharmacy transaction information. Additionally or alternatively, the retailer client application may provide coupons, discounts, product information, and other notifications particular to a specific physical retail store in or near which the user's mobile electronic device is located.

In an implementation, the retailer client application executing on the user's mobile electronic device, in combination with one or more of the retailer's servers, may identify a physical retail store proximate to the electronic device, or otherwise a physical retail store in which the electronic device is located. The retailer's servers may provide, to the retailer client application, information specific to products and/or services at the identified physical retail store, and the retailer client application executing on the user's electronic device may dynamically and automatically present the information in a user interface on the mobile electronic device for the user to view and optionally request additional information.

In an embodiment, the information specific to the products and/or services at the identified physical retail store and displayed on the user interface of the mobile electronic device may correspond to at least a subset of Recently Viewed Items from one or more previous visits of the user at the retailer's electronic store. For example, the retailer's servers may obtain indications of the one or more RVIs corresponding to one or more previous visits of the user to the retailer's electronic store, e.g. by accessing data stored in the global cookie associated with the user account. Based on the obtained indications of the one or more RVIs, the retailer's servers may determine information that corresponds to the one or more RVIs and that is particular to the physical retail store proximate to the user's electronic device. Examples of such information may include respective prices of the RVIs at the physical retail store; sales, coupons, or discounts for the RVIs at the physical retail store; indications of respective availability of the RVIs at the physical retail store (and rain checks for certain items, if applicable); an area or location within the physical retail store at which each RVI may be found; and/or other information. Accordingly, the user may be provided with a seamless retail experience that spans previous visits to the retailer's electronic store and a current visit at a physical retail store. For example, items on which the user focused during his or her previous visits to the retailer's electronics retail store may be easily accessed, found, and/or explored in person by the user while he or she is at the physical retail store. Furthermore, any sales, discounts, coupons, etc. applicable to RVIs at the particular physical retail store may automatically be presented to the user on his or her portable electronic device. As such, the user is automatically reminded of previously viewed items of interest, and is automatically presented with information that is contextual to those items and to his or her current location.

In some embodiments, the set of Recently Viewed Items displayed at a user's electronic device may be determined based on respective times that have elapsed since the user last focused on the RVIs at the retailer's electronic store. For example, only those items whose respective elapsed time intervals since the item's last viewing or user focus event at the electronic retail store are below a threshold may be displayed on the user's electronic device.

The embodiments as discussed herein therefore offer benefits to the users of the electronic devices as well as to retailers. In particular, the automatically presented, contextual RVI information may provide relevant information to supplement a customer's shopping experience with the retailer across electronic and physical retail stores, thus improving the retail experience for the customer. Further, by automatically reminding customers of previously viewed items of interest and automatically providing respective location-specific pricing, deals, availability, etc. for these items to customers, retailers are able to provide seamless marketing across electronic and physical store locations, build brand loyalty, increase customer retention, and generally increase the satisfaction of customers. It should be appreciated that other advantages and benefits are envisioned.

The systems and methods discussed herein therefore address, inter alia, a challenge that is particular to electronic devices. In particular, the challenge relates to the general inability of electronic devices to be aware of their current environments or settings. In some situations, then, electronic devices are unable to offer certain improved functionalities that may be afforded by certain network connections and having access to information that is normally not able to be ascertained. This is particularly apparent in functionalities which may result in improved experiences for users of the electronic devices. For example, instead of being limited by functionalities programmed within applications, the electronic devices of the present embodiments may connect to external components to automatically obtain information associated with products that were recently viewed by a user at a retailer's electronic store and that may be available for sale at a physical retail store within proximity of the electronic devices. Further, as an example, the electronic devices have the capability to dynamically indicate information associated with the products, such as locations within the store, general information associated with the products, availability of the products, and/or available discounts or coupons for the products. Accordingly, the systems and methods are necessarily rooted in computer technology in order to overcome the noted shortcomings that specifically arise in the realm of electronic devices.

Similarly, the systems and methods provide improvements in a technical field, namely, e-commerce. Instead of the systems and methods merely being performed by hardware components using basic functions, the systems and methods employ complex steps that go beyond the mere concept of simply retrieving and combining data using a computer and/or a computer network. In particular, the hardware components enable the detection and determination of not only a current physical location of an electronic device, but the determination of a physical retail store and its environment at or near the electronic device's current physical location. The hardware components also may allow an interface with a server so that information that is generated by the user or customer during visit(s) to a retailer's electronic store may be centrally stored and accessed. Additionally, the hardware components may allow the use of the stored visit information to filter, search, select, and obtain information that is particular to both the electronic store visit(s) and to the physical store environment in or near the electronic device's current physical location, i.e., information that is presently and conventionally unavailable. Further, the hardware components may allow the information particular to previous electronic store visit(s) and to electronic device's determined environment to automatically and dynamically be displayed at the electronic device, thereby facilitating e-commerce functionalities via the network connections. This example combination of elements imposes meaningful limits in that the operations are applied to improve e-commerce by enabling electronic device users to facilitate enhanced or improved e-commerce features that utilize current network capabilities in a meaningful and effective way.

Further, the systems and methods described herein address, inter alia, a network-centric challenge of providing a user of the mobile electronic device with context from the user's previous on-line activities at a retailer's electronic retail store, even when the user is not on-line at the retailer's electronic store. Still further, the systems and methods described herein may filter or customize the provided context of the user's previous on-line activities at the retailer's electronic retail store based on a current location of the mobile electronic device. Consequently, at least some of the concepts described herein are more than generally linking the general concept of organizing and comparing data by using a computer and/or a computer network, as they provide unconventional steps and/or components directed to a particular useful application.

Turning now to FIG. 1A, FIG. 1A illustrates an overall system 100 including various components configured to implement the various embodiments. The system 100 may include a combination of hardware and software components, as well as various data communication channels for communicating data between and among the various hardware and software components. The system 100 may be roughly divided into front-end components 102 and back-end components 104. At least one of the front-end components 102 may be primarily disposed within a retail network 110 that may include one or more physical retail stores 112. The physical retail stores 112 may be located, by way of example rather than limitation, in separate geographic locations from each other, including different areas of the same city, different cities, or even different states. According to the present embodiments, each of the physical retail stores 112 may be a "brick and mortar" store that may include one or more physical buildings or structures, where each of the physical retail stores 112 may accommodate shoppers and customers. A brick and mortar store may be distinguished from a mail-order store, and may be distinguished from an electronic store, on-line store, or website, which is described in a later section.

The front-end components 102 may include a number of workstations 128 or computing devices. The workstations 128 may be local computers located in the various physical retail stores 112 throughout the retail network 110 and may be capable of executing various applications. Retail store personnel (not shown) may use the applications executing at the workstations 128 to, for example, access customer information, access images, and payment information, and/or other data.

Internet-enabled devices (or client devices) 206-216 (e.g., personal computers, cellular phones, smart phones, internet-enabled televisions, etc.) may be communicatively connected to the physical retail stores 112 and/or to the back end components 104 through one or more digital networks 130, as described below. The client devices 206-216 may, but need not be, disposed within the retail network 110.

Those of ordinary skill in the art will recognize that the front-end components 102 may also comprise a plurality of facility servers 126 disposed at the plurality of physical retail stores 112 instead of, or in addition to, a plurality of workstations 128. Each of the physical retail stores 112 may include one or more facility servers 126 that may facilitate communications between the workstations 128 of the physical retail stores 112 via the digital network(s) 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 may also refer to the facility servers 126, and vice versa. Moreover, environments other than the physical retail stores 112 may employ the workstations 128 and the servers 126.

The front-end components 102 may communicate with the back-end components 104 via the digital network(s) 130. One or more of the front-end components 102 may be excluded from communicating with the back-end components 104 by configuration or by limiting access due to security concerns. For example, the internet-enabled devices 206-216 may be excluded from direct access or only provided with limited access to the back-end components 104. In some embodiments, the physical retail stores 112 may communicate with the back-end components via the digital network(s) 130. In other embodiments, the physical retail stores 112 and the internet-enabled devices 206-216 may communicate with the back-end components 104 via the same portions of the digital network 130, but digital access rights, IP masking, and other network configurations may deny access to the internet-enabled devices 206-216. In an embodiment, the network 130 may include respective, local wireless communication networks provided in or near the physical retail stores 112 via which Internet-enabled devices 206-216 may communicatively connect to other front-end components 102 and/or to the back-end components 104. The network 130 may additionally or alternatively support communicative connections between applications 118 executing on the devices 206-216 and the back-end components 104. For example, the applications 118 may include a web-browser and/or a downloaded retailer client application that communicate with one or more back-end components 104 via the network 130.

The digital network(s) 130 may be a proprietary network, a secure public Internet, a virtual private network or some other type of network, such as dedicated access lines, plain ordinary telephone lines, satellite links, wireless links, wired links, combinations of these, etc. Where the digital network 130 comprises the Internet, data communication may take place over the digital network 130 via an Internet communication protocol. In addition to one or more servers 202 that are configured to communicate with client or front-end applications (e.g., as described below), the back-end components 104 may include the central processing system 140.

Of course, the physical retail stores 112 may be communicatively connected to different back-end components 104 having one or more functions or capabilities that are similar to the central processing system 140. The central processing system 140 may include one or more computer processors 162 adapted and configured to execute various software applications and components of the system 100, in addition to other software applications. The central processing system 140 may further include one or more databases 146. The database(s) 146 may comprise one or more data storage devices that are adapted to store data related to the operation of the system 100, such as product data and/or customer data. In particular, the database(s) 146 may store information associated with items/products and/or services that are available for sale in various ones of the physical retail stores 112. For example, the database(s) 146 may store locations of the items/products (e.g., aisle number or other information), pricing information, availability and inventory information, coupon(s) associated with the items/products and/or services, and more detailed information associated with the items/products and/or services (e.g., product descriptions). Additionally or alternatively, the database(s) 146 may store information related to various customers or users associated with the retailer, e.g., user accounts. The central processing system 140 may access data stored in the database(s) 146 when executing various functions and tasks associated with the operation of the system 100. The central processing system 140 may also maintain and update the data stored in the database(s) 146. For example, the central processing system 140 may generate coupons for the items/products and/or services, update availability and inventory information (such as if a certain product is purchased from one of the physical retail stores 112), and/or update passwords, user preferences, and default payment methods for various users. It should be appreciated that additional data and additional techniques for maintaining and updating the data are appreciated. It should also be appreciated that although the database 146 is shown as a single entity in FIG. 1A, the database 146 may be implemented using any one or more databases and any one or more data storage devices.

Further, although FIG. 1A depicts the system 100 as including the central processing system 140 in communication with three physical retail stores 112, and various internet-enabled devices 206-216 it should be understood that different numbers of processing systems, retail stores, and devices may be utilized. For example, the digital network(s) 130 (or other digital networks, not shown) may interconnect the central processing system 140 to a plurality of included central processing systems 140, hundreds of physical retail stores 112, and thousands of internet-enabled devices 206-216. According to the disclosed example, this configuration may provide several advantages, such as, for example, enabling near real-time uploads and downloads of information as well as periodic uploads and downloads of information. This may provide for a primary backup of all the information generated in supported functionalities. Alternatively, some of the physical retail stores 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 may include a program memory 160, the processor 162 (which may be called a microcontroller or a microprocessor), a random-access memory (RAM) 164, and the input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain or be configured with machine-readable instructions (i.e., software) 171, for execution by the processor 162. The software 171 may perform the various tasks associated with operation of the retail stores, and may be a single module 171 or a plurality of modules 171A, 171B. While the software 171 is depicted in FIG. 1A as including two modules, 171A and 171B, the software 171 may include any number of modules accomplishing tasks related to retail store operation. The central processing system 140 may implement a server application 113 for providing data to a user interface application 111 operating on the workstations 128.

Figure 1B:
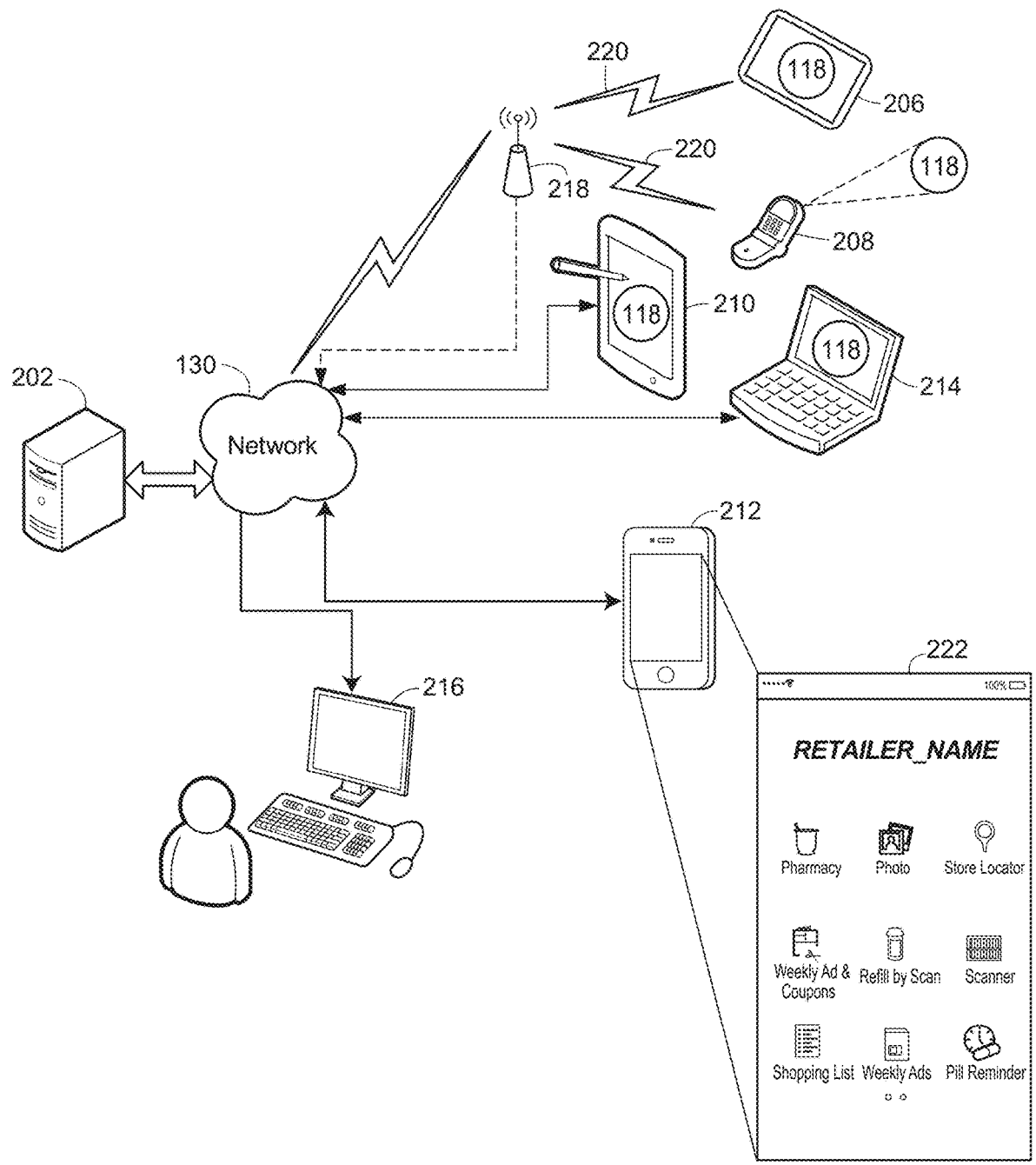
Figure 1C:
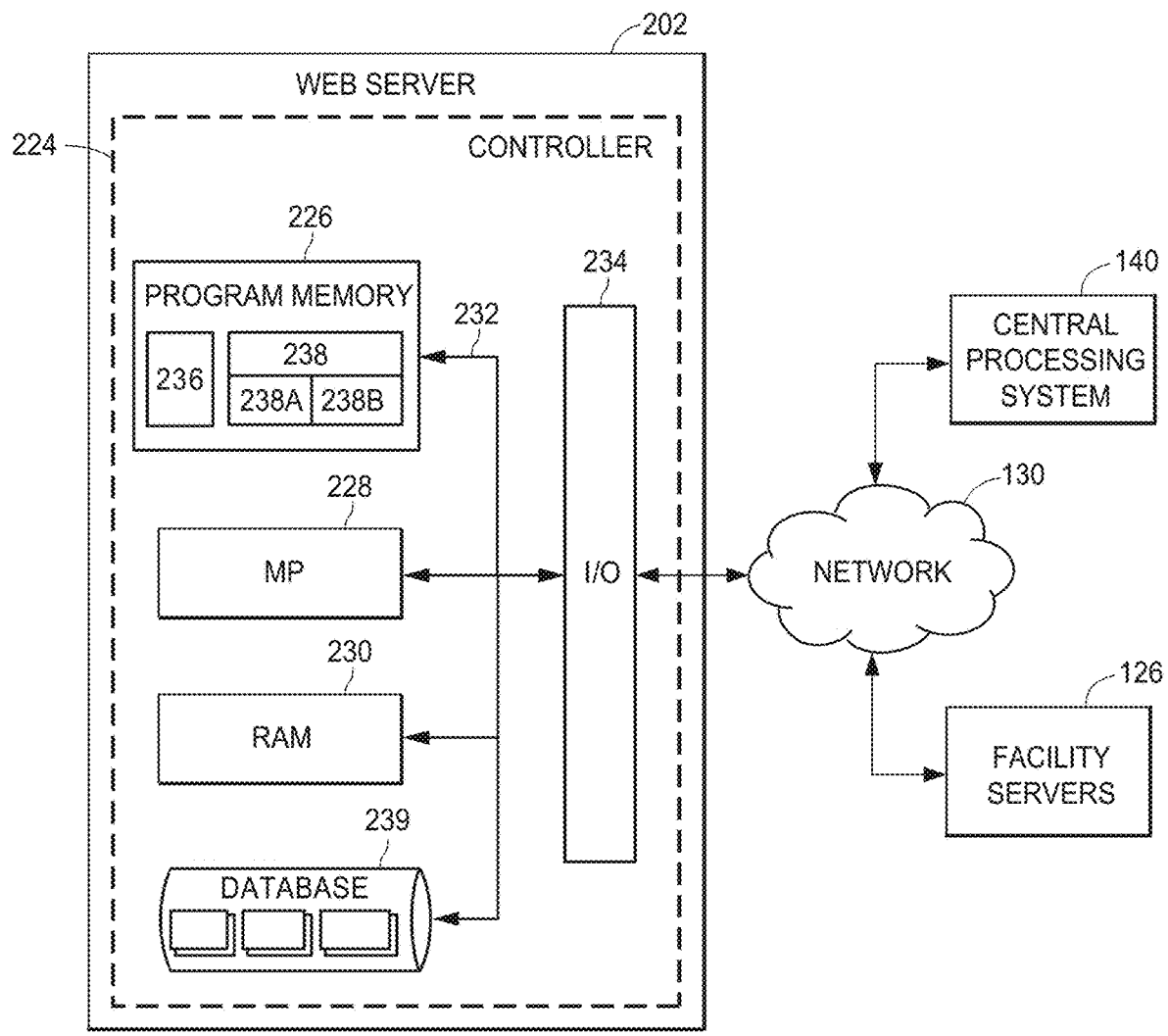

For purposes of implementing the system 100, a user may interact with the server 202 and the retail store systems (e.g., the central processing system 140) via one of the internet-enabled devices 206-216 via a mobile device application, a specialized application, or one or more web pages 118. In an example, FIG. 1B depicts the server 202 connected via the network 130 to the internet-enabled devices 206-216 executing or running applications 118 through which a user may initiate and interact with the system 100 (as shown in FIG. 1A). The internet-enabled devices (or generally, "electronic devices") 206-216 may include, by way of example, a tablet computer 206, an internet-enabled cell phone 208, a personal digital assistant (PDA) 210, a smart phone 212, a laptop computer 214, a desktop computer 216, a portable media player (not shown), and/or others. Further, each application 118 executing on its respective host device 206-216 may be a web browser, a client application provided by the retailer, or some other client application via which a communicative connection or session may be established with the server 202, e.g., to access the electronic retail store of the retailer, and/or to access user account information.

The internet-enabled devices 206-216 need not necessarily communicate with the network 130 via a wired connection. In some instances, the internet-enabled devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the internet-enabled devices 206-216 may interact with the server 202 to receive web pages or server data from the server 202 and may display the web pages or server data via its respective client application 118 (described below). For example, the mobile device 212 may display a home screen 222 (i.e., the root or start page at which users enter the client application) of the retailer client application 118 to the user, may receive an input from the user, and may interact with the server 202 depending on the type of user-specified input. It will be appreciated that although only one server 202 is depicted in FIG. 1B, multiple servers 202 may be provided for the purpose of distributing server load, serving different web pages, implementing different portions of the electronic retail store web interface, servicing different retailer client applications, etc. These multiple servers 202 may include a web server, an entity-specific server (e.g. an Apple® server, etc.), a server that is disposed in a retail or proprietary network, an independent third-party server that is not under the control of the entity, or others.

Turning now to FIG. 10, the server 202, like the facility server 126, may include a controller 224. Similar to the controllers 155 and 170, the controller 224 may include a program memory 226, a microcontroller or a microprocessor (MP) 228, a random-access memory (RAM) 230, and an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data that may be used to interact with the user through the network 130. According to embodiments, the database 239 may store the same or similar data as that stored by the database 146 as discussed with respect to FIG. 1A. Further, the database 239 may be implemented on one or more data storage devices.

As discussed with reference to the controllers 155 and 170, it should be appreciated that although FIG. 10 depicts only one microprocessor 228, the controller 224 may include multiple microprocessors 228. Similarly, the memory of the controller 224 may include multiple RAMs 230 and multiple program memories 226. Although the FIG. 10 depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the internet-enabled devices 206-216, as depicted in FIG.

1B, FIG. 10 illustrates that the server 202 may also be connected through the network 130 to the central processing system 140 and/or one or more facility servers 126. As described below, the connection of the server 202 to the central processing system 140 may assist in facilitating various functionalities. As a result, the server 202 may act as a routing or interfacing server between the plurality of internet-enabled devices 206-216 and a destination server, namely, the central processing system 140. For example, the server 202 may be configured to communicate with the central processing system 140 and with the internet-enabled devices 206-216 via a multitude of protocols, such as packet-switched protocols, web services, web APIs (Application Programming Interface), etc. The server 202 may also convert (if necessary) and route client application data (not shown) to the appropriate server, such as the central process system 140 for example. Additionally, the server 202 may act as the destination server and need not route any data from the internet-enabled device 206-216.

As shown in FIG. 10, the program memory 226 and/or the RAM 230 may store various applications for execution by the microprocessor 228. For example, a user-interface application 236 may provide a user interface to the server 202, which user interface may, for example, enable a network administrator to configure, troubleshoot, or test various aspects of the server's operation, or otherwise to access information thereon. A server application 238 may operate to populate and transmit client application data and web pages to the internet-enabled devices 206-216, receive information from the user transmitted back to the server 202, and forward appropriate data to the central processing system 140 and the facility servers 126.

Like the software 171 of FIGS. 1A and 1B, the server application 238 may be a single module 238 or a plurality of modules 238A, 238B. While the server application 238 is depicted in FIG. 10 as including two modules, 238A and 238B, the server application 238 may include any number of modules that may facilitate tasks related to implantation of the server 202. By way of example, the module 238A may populate and transmit the client application data and/or may receive and evaluate inputs from the user to receive a data access request, while the module 238B may communicate with one or more of the back end components 104 to fulfill a data access request.

Figure 1D:
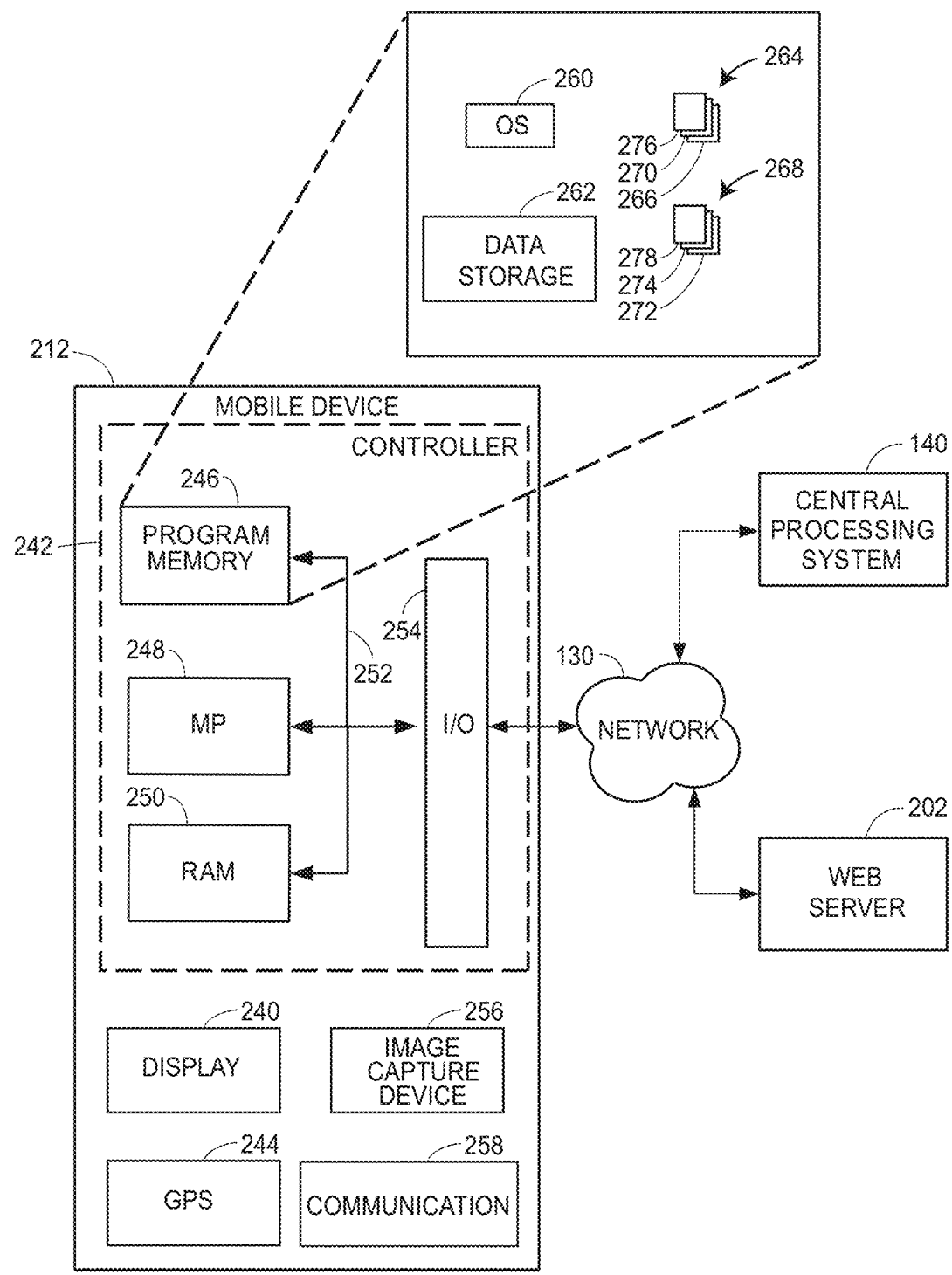

Referring now to FIG. 1D, the mobile device 212 (or any of the internet-enabled devices 206-216) may include a display 240, a Global Positioning System (GPS) unit 244 (which may include respective one or more sensors), a communication unit 258 (which may include respective one or more sensors), an image capture device 256, a user-input device (not shown), and, like the server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which may be interconnected via an address/data bus 252.

The program memory 246 may include an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple® Inc., Google® Inc., Palm® Inc. (now Hewlett-Packard Company®), Microsoft Corporation®, Research in Motion® (RIM), and Nokia®, respectively. The data storage 262 may include data such as user profiles, application data for the plurality of applications 264, routine data for the plurality of routines 268, and other data necessary to interact with the server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that may reside within the mobile device 212.

The GPS unit 244 may use "Assisted GPS" (A-GPS), satellite GPS, or any other suitable global positioning protocol, transceivers, sensors, or system that locates the position of the mobile device 212. For example, A-GPS utilizes terrestrial cell phone towers or Wi-Fi hotspots (e.g., wireless router points) to more accurately and more quickly determine location of the mobile device 212 while satellite GPS generally may be more useful in more remote regions that may lack cell towers or Wi-Fi hotspots. The communication unit or module 258 may communicate with the server 202 via one or more transceivers that support any suitable wireless communication protocol network or networks, such as a wireless telephony network (e.g., GSM, CDMA, LTE, etc.), a WLAN network (or other similar network according to 802.11 standards), a WiMAX network, a Bluetooth network, and/or others. In some implementations, the wireless communication protocols and/or networks supported by the communication unit or module 258 may transport location information or information indicative of a location of the electronic device 212.

The image capture device 256 may be a built-in camera within the mobile device 212 or may be an external camera, such as a webcam, that is communicatively coupled with the mobile device 212 (or any other internet-enabled device 206-216). The user-input device or generally a user interface (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. The user interface (which may include the display 240) may be configured to present information to the user and/or receive inputs from the user, and may accordingly include a set of I/O components (e.g., capacitive or resistive touch sensitive input panels, keys, buttons, lights, LEDs, cursor control devices, haptic devices, and others). In embodiments, the display 240 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like.

As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the server 202, the facility servers 126, or the server applications 113 while also receiving inputs from the user.

Another application of the plurality of applications may include a location awareness application 276 that may be implemented as a series of machine-readable instructions for receiving, interpreting, and displaying location information of the mobile device 212 (or any other internet-enabled device 206-216), e.g., as determined based on information detected or determined by the GPS unit 244 and/or by go to sleep the communication unit or module 258. One of the plurality of routines may include an image capture routine 272 that coordinates with the image capture device 256 to retrieve image data for use with one or more of the plurality of applications, such as the client application 266, or for use with other routines. Another routine in the plurality of routines may include an image display routine 274 that receives and interprets image data of any type or format for display. Likewise, the image display routine 274 may coordinate with the image capture routine 272 to obtain image data and process the image data into a displayable format for use with the client application 266.

A customer or generally a user may launch the client application 266 from an internet-enabled device, such as one of the internet-enabled devices 206-216, to access the server 202 cooperating with the central processing system 140 and the retail network 110. Additionally, the customer or the user may also launch or instantiate any other suitable user interface application 118 (e.g., the web browser 270, or any other one of the plurality of software applications 264) to access the server 202, the facility servers 126, or the server applications 113. Generally, the term "user" is used when referring to a person who is operating one of the internet-enabled devices 206-216 and is not exclusive of the term "customer." For example, multiple users may utilize a particular customer's account, such as when children utilize their parent's account. As described above, one or both of the databases 146 and 182, illustrated in FIGS. 1A and 1B, respectively, may include various information about the retail store's customers, as well as basic biographical information about the customer, such as a customer name, a customer address, a customer phone number, coupons redeemed by the customer, and the like. Customer account records are among the exemplary data that the system 100 may store on the databases 146 and 182.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 248 (e.g., working in connection with the operating system 260) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Figure 2:
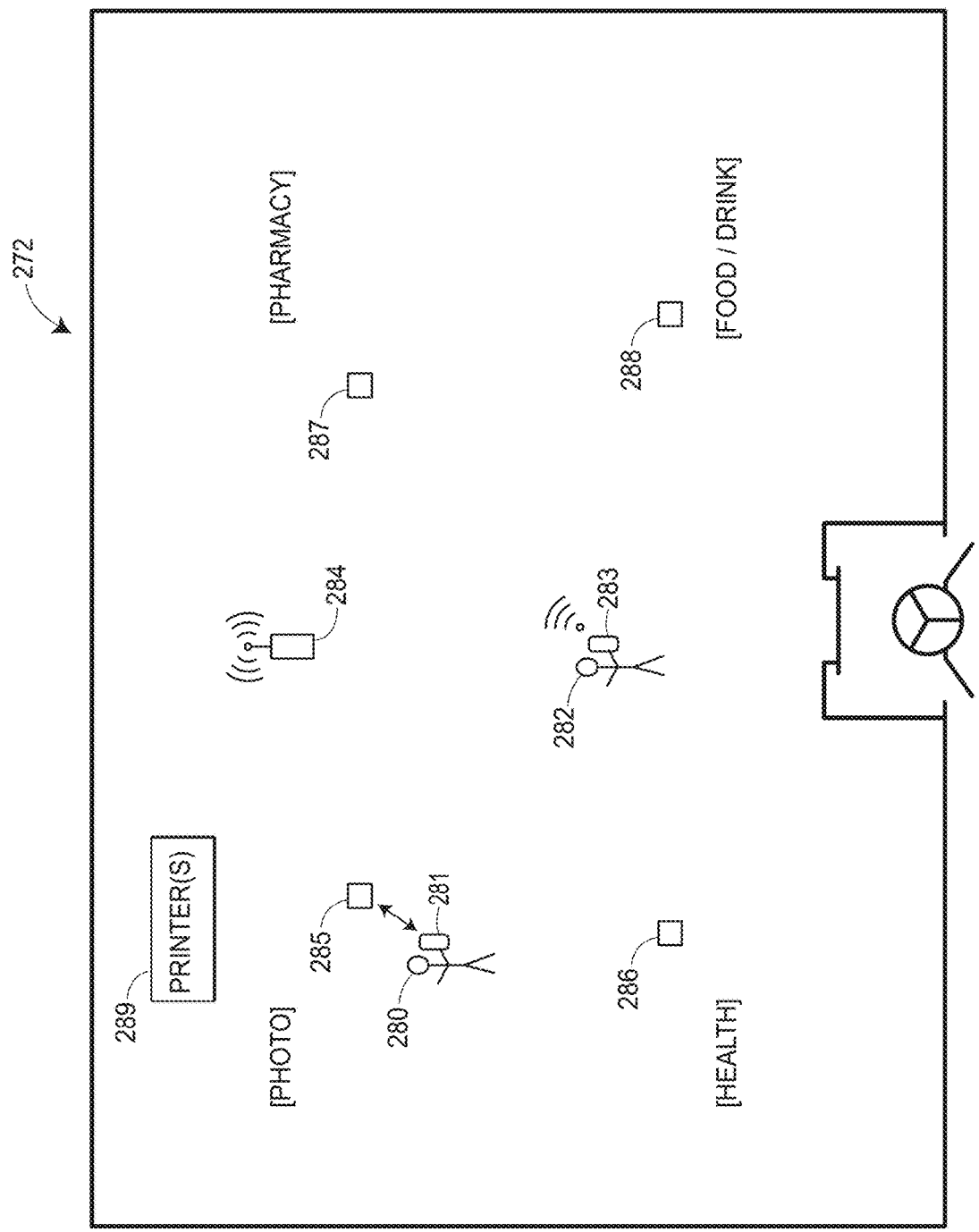
FIG. 2 depicts an exemplary layout of a physical retail store of a retailer and supported connections, in accordance with some embodiments.

Referring to FIG. 2, depicted an example layout of an example physical retail store 272 (such as the physical retail store 112 as described with respect to FIG. 1A). In the example depicted in FIG. 2, the physical retail store 272 is a pharmacy that may include different departments or sections (as shown: photo, pharmacy, health, and food/drink); however it should be appreciated that other types of retail stores and general environments are envisioned. Each of the different departments or sections may include various components, devices, or the like. For example, as depicted in store 272, the photo section may include one or more printers 289 that may be configured to print digital images.

Customers or users 280, 282 may enter the retail store, browse in the various departments or sections, and/or purchase any desired items/products or services. Each of the customers 280, 282 may be equipped with a respective electronic device 281, 283 (such as one of the Internet-enabled devices 206-216 as described with respect to FIG. 1A). Each electronic device 281, 283 may be any type of portable electronic device, for example, a notebook computer, a tablet, a mobile phone, a Personal Digital Assistant (PDA), a smart phone, a tablet computer, a multimedia player, an MP3 or MP4 player, a digital or analog broadcast receiver, a remote controller, or any other electronic apparatus.

According to embodiments, the physical retail store 272 may support various wireless local area network s (WLAN) and wireless personal area networks (WPAN) to which the electronic devices 281, 283 may connect. In one particular implementation, the physical retail store 272 may include one or more wireless access points (AP) 284 to which the electronic devices 281, 283 may connect, e.g. via a suitable transceiver and a WLAN connection. Accordingly, when the electronic devices 281, 283 are connected to the AP 284, the electronic devices 281, 283 may be connected to the local area network implemented within the physical retail store 272 (i.e., the physical retail store 272 may be an Internet "hotspot").

The physical retail store 272 may also be configured with a plurality of transmitters 285, 286, 287, 288 or "beacons" that may be disposed throughout the area of the physical retail store 272. Although FIG. 2 depicts the physical retail store 272 supporting four (4) transmitters 285-288, it should be appreciated that the physical retail store 272 may support fewer or additional transmitters. The plurality of transmitters 285-288 may be disposed in various locations of the physical retail store 272 (e.g., each department may include a single transmitter). Each of the plurality of transmitters 285-288 may be secured to various components of the physical retail store 272 (e.g., shelves, ceiling, etc.). Each of the plurality of transmitters 285-288 may include any combination of hardware and software components, including a module for transmitting or broadcasting signals. Further, each of the plurality of transmitters 285-288 may be configured to be powered by a battery or via another power source.

According to embodiments, each of the plurality of transmitters 285-288 may support one or more short-range communication protocols such as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. Each of the plurality of transmitters 285-288 may also be configured to broadcast or transmit a signal that may include any stored data. In one embodiment, each of the plurality of transmitters 285-288 may continuously broadcast a signal that may include a unique identifier of the corresponding transmitter 285-288.

The signals that the transmitters 285-288 broadcast may have an associated detection range depending on the type of communication protocol. Generally, Bluetooth® signals have a range of 100 meters and BLE signals have a range of 50 meters. The detection range of the signal that the transmitters 285-288 broadcast may also vary and may be programmable. For example, the range of a first signal that is broadcast by the transmitter 285 may be fifteen (15) meters while the range of a second signal that is broadcast by the transmitter 286 may be twenty-five (25) meters.

When one of the electronic devices 281, 283 is within broadcast range of one of the transmitters 285-288, the electronic devices 281, 283 can detect and receive the signal, e.g. via a suitable transceiver. In particular, a communication module of the electronic devices 281, 283 that supports a short range communication protocol (e.g., a BLE chip) can detect and receive the signal. For example, FIG. 2 depicts the electronic device 281 detecting the signal broadcast by the transmitter 285.

According to embodiments, the electronic devices 281, 283 (and any application executing thereon) may facilitate various features of a user's retail experience when connected to various ones of the connections within the physical retail store 272. In particular, the electronic devices 281, 283 may detect one or more of the transmitters 285-288, and/or may connect to (or may detect the availability of) the access point 284, and may in turn connect to an on-site server or a remote server to facilitate a user's retail experience within the physical retail store 272.

Figure 3A:
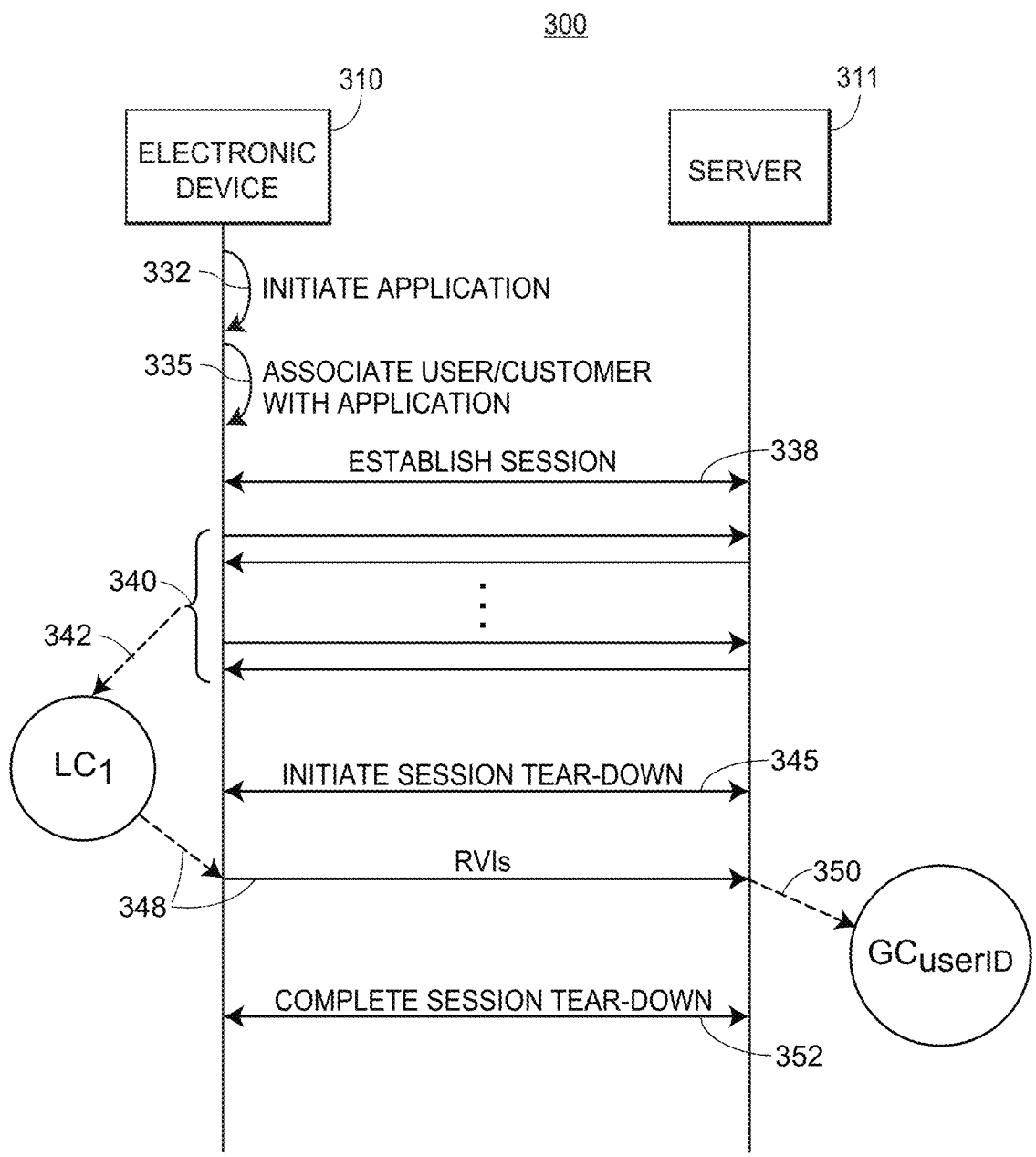
FIGS. 3A and 3B are example signal diagrams associated with providing a seamless retail experience across various stores of a retailer, in accordance with some embodiments.

FIG. 3A depicts an example signal diagram 300 associated with providing a seamless retail experience for a user or customer between different stores of a retailer. In particular, the signal diagram 300 depicts a user's or customer's experience at an electronic retail store of a retailer. For ease of discussion, and not for limitation purposes, FIG. 3A is discussed with simultaneous reference to FIGS. 1A-1D and FIG. 2, although the signal diagram 300 of FIG. 3A may be utilized with other systems and other computing devices.

FIG. 3A includes an electronic device 310 and a server 311. A user or customer of a retailer may operate the electronic device 310 to access the retailer's electronic retail store. According to embodiments of the signal diagram 300, a user may operate the electronic device 310 at any desired location, and need not operate the electronic device 310 proximate to a physical retail store of the retailer. For example, the electronic device 310 may be the user's home computer, work computer, or mobile device, or electronic device 310 may be a public computer, such as a computer provided by a library. In an embodiment, the electronic device 310 may be one of the devices 206-216 of FIGS. 1A and 1B.

The server 311 may comprise one or more of the backend components 104 of the retailer, such as the server 202 and/or the central processing system 140 and/or may comprise one or more facility servers 126 of the retailer. Indeed, although the server 311 is discussed herein in the singular tense, it is understood that the server 311 may include any number of front-end and/or back-end servers of the retailer.

The signal diagram 300 may begin when the electronic device 310 initiates (332) the execution of an application stored thereon, where the application may be associated with the retailer. In an embodiment, the application may be an instance of the application 118 of FIGS. 1A and 1B. For example, if the retailer is a pharmacy, then the application may be offered by the associated pharmacy company. In another example, the application may be a web browser that allows the user to access a website of the retailer. The user or customer may be electronically associated (335) with the instance of the initiated application executing on the device 310, for example, by generating, storing, and/or accessing electronically stored data linking the user or customer to the instance of the initiated application. Access to the initiated application may require authentication and/or authorization, e.g., by logging on with a user name/password combination, by providing an account number and/or personal identification number or PIN, or by otherwise identifying an authorized user of the initiated application. In an example, authentication and/or authorization of the user may be performed by the initiated application, by another application executing on the electronic device 310, and/or by the server 311.

The initiated application may enable the user to facilitate various operations and generally make selections at the retailer's electronic store by using the electronic device 310, such as via a user interface of the electronic device 310. To this purpose, and to other purposes, the electronic device 310 may connect to the server 311, and may establish a communication session (338) with the server 311. As is commonly known, such communication sessions are temporary or have finite duration or lifetime of existence. Via the established session, the electronic device 310 may send data to and receive data from the server 311 (340), e.g., via the network 130. For example, the data that is sent between the electronic 310 and the server 311 (340) may be indicative of searches that the user performs, indications of products that the user clicks on or otherwise views or selects, the user's wish lists, the user's shopping baskets, purchases, shipping information, changes to a user profile and/or account, and/or other data generated and collected during the session that corresponds to the user's visit at the retailer's electronic store.

During the established session, at least a subset of the sent/received data 340 may be stored locally at or in conjunction with the established session (342), e.g., in a local cookie $LC_1$ or similar. For example, indications of products that the user has viewed and/or selected (e.g., by clicking on, by hovering over, or otherwise directing focus to) may be stored (342) in the local cookie $LC_1$. In some cases, an indication of a product may be stored in conjunction with a timestamp.

In an embodiment, at some point in time, either the electronic device 310 or the server 311 may initiate the ending or termination of the established session (345). In response, the electronic device 310 may send, to the server 311, an indication of one or more products whose respective indications are stored in the local cookie $LC_1$, (348). Generally, the products indicated in the transmission 348 are ones that the user has viewed or otherwise selected during the session at the electronic retail store, but that were not purchased during the session (e.g., Recently Viewed Items or RVIs of the session). Indications of RVIs from the user's session (348) may be stored (350) by the server 311 in a back end, centralized database, such as the database 146. In an embodiment, indications of the RVI from the user's session 345 are stored (350) in conjunction with an indication of the particular user or customer associated with the session (e.g., are stored in conjunction with the user's or customer's account). For example, indications of Recently Viewed Items (RVI) from the particular user's or customer's session may be stored (350) in a global cookie or similar associated with the particular user or customer, e.g., $GC_{userID}$. The global cookie or similar may be maintained or stored in a centralized data storage area of the system 100, such as the database 146 or some other backend component 104. Eventually, the session tear-down may be completed (352), thereby resulting in the deletion of the local cookie $LC_1$, and the persistence of at least some of the data previously stored therein at the global cookie $GC_{userID}$.

The user or customer may subsequently establish any number n of other sessions via the electronic device 310 and/or via some other electronic device (not shown), and indications of respective Recently Viewed Items of the subsequent n sessions may be stored locally with each respective session (e.g., in respective local cookies $LC_n$) during the session's lifetime. Upon termination of each session n, indications of the session's Recently Viewed Items may be transferred or otherwise sent to be stored centrally at the retailer's back end components 104 in conjunction with an indication of the particular user or customer. For example, indications of each session's RVIs may be added to the global cookie $GC_{userID}$. Accordingly, data associated with each session of the particular user or customer at the electronic retail store (e.g., RVI data) is centrally saved at the database 146 over time, and is specifically associated with the particular user or customer.

In some scenarios, indications of session RVIs may be additionally or alternatively transmitted for centralized storage at the retailer's back end components 104 at various times during the session. For example, RVI transmission (348) to the server 311 may occur one or more times during the session, and not (only) when triggered by the initiation of session tear-down (345).

Additionally, respective global cookies may be established at the database 146 or centralized data storage of the system 100 for each different user or customer x of the retailer, e.g., $GC_x$. In an embodiment, each user's global cookie is associated with his or her account with the retailer.

In an embodiment, the indication of each particular RVI product stored in the local cookie $LC_1$, and/or stored in the global cookie $GC_{userID}$ may have a lifetime based on when the user last viewed and/or focused on (e.g., a respective focus event) the item at the electronic retail store. For example, after a predefined amount of time has elapsed since the user last viewed or focused on a particular item during a visit to the electronic retail store, the indication of the particular item stored in the local cookie $LC_1$, and/or in the global cookie $GC_{userID}$ may be deleted. For example, the server 311 and/or the application executing on the user electronic device 310 may delete, from local cookie $LC_1$, and/or the global cookie $GC_{userID}$, the indications of RVIs that have met or exceeded their storage lifetime. It is noted, though, that although the contents of the global cookie $GC_{userID}$ associated with the user or user account may vary over time, the global cookie $GC_{userID}$ itself may persist for a longer interval of time than the local cookies $LC_x$ associated with the user or user account. For example, each local cookie $LC_x$ may cease to exist when or after its corresponding session is torn down, while the global cookie $GC_{userID}$ may remain in existence across the lifetimes of several sessions that occur over different time intervals. Indeed, in some embodiments, the global cookie $GC_{userID}$ may remain in existence while its associated user account is enabled or active.

Figure 3B:
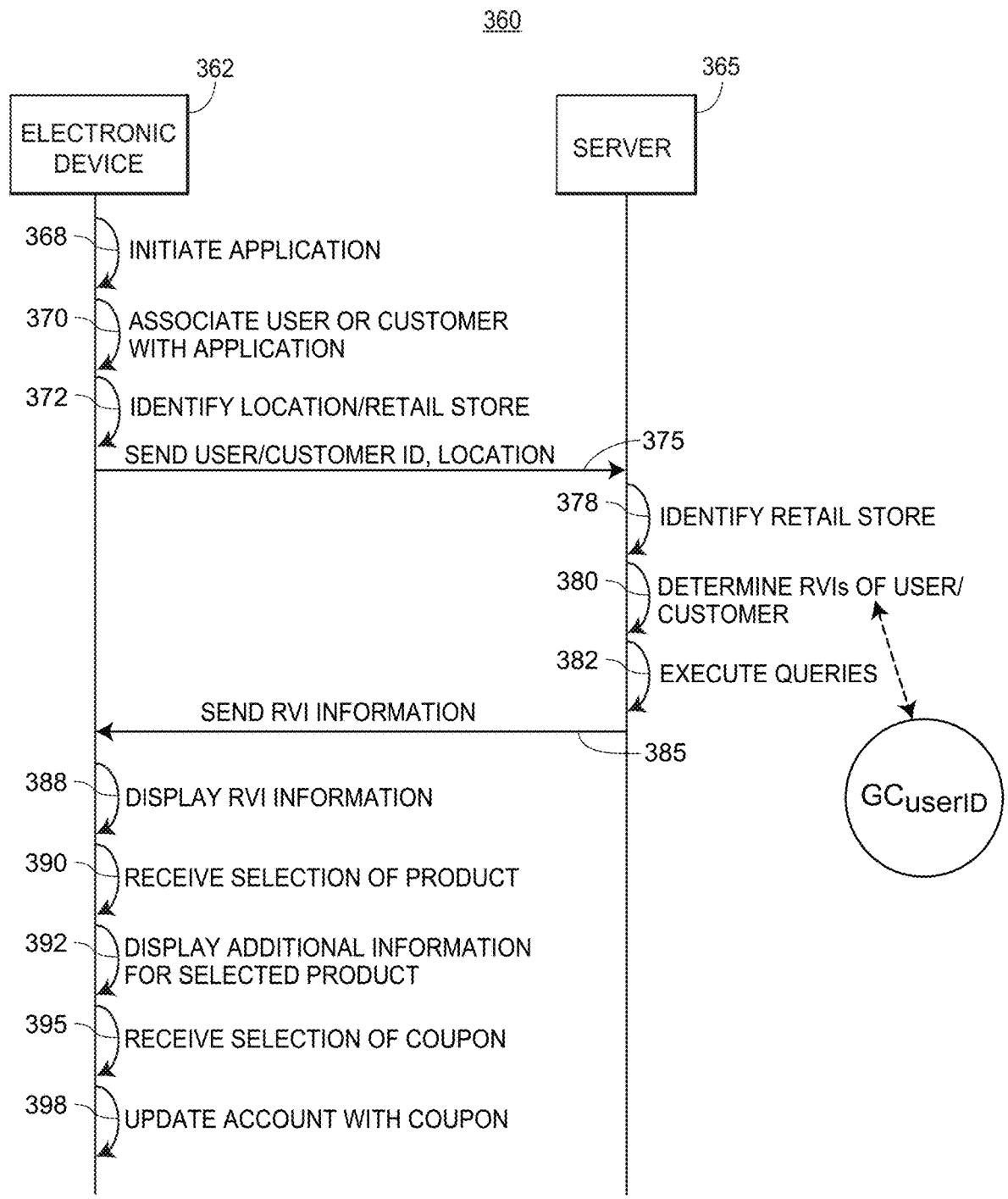

FIG. 3B depicts an example signal diagram 360 associated with providing a seamless retail experience for a customer between different retail stores of a retailer. In particular, the signal diagram 360 depicts a scenario in which the user or customer of FIG. 3A visits or is in proximity to a physical retail store of the retailer at some time after he or she has visited the retailer's electronic store, e.g., at some time after the signal diagram 300 of FIG. 3A has occurred. For ease of discussion, and not for limitation purposes, FIG. 3B is discussed with simultaneous reference to FIGS. 1A-1D, FIG. 2, and FIG. 3A, although the signal diagram 360 of FIG. 3B may be utilized with other systems and with other computing devices.

FIG. 3B includes a mobile or portable electronic device 362 and a server 365. A user or customer of the retailer (e.g., the user or customer of FIG. 3A) may operate the mobile electronic device 362 while he or she is inside or in proximity to a physical retail store of the retailer. The mobile electronic device 362 may be the device 310 via which the retailer's electronic retail store was accessed in FIG. 3A, or may be a different electronic device. In an embodiment, the electronic device 362 may be one of the devices 206-216 of FIGS. 1A and 1B.

The server 365 may be located within the physical retail store or similar environment, and/or may comprise one or more of the back-end components 104 configured to directly communicate with the electronic device 352 (such as the server 202 and/or the central processing system 140). In an implementation, the server 365 is one of the facility servers 126 that is communicatively connected with the backend components 104 via the network 130. In another implementation, if the server 365 is a back-end component 104, the electronic device 362 may connect to an in-store server 126 (e.g., via a WLAN connection), which in turn may communicate with the server 365 via the network 130. Indeed, although the server 365 is discussed herein in the singular tense, it is understood that the server 365 may include any number of front-end and/or back-end servers of the retailer. In an embodiment, the server 365 of FIG. 3B is the same as the server 311 of FIG. 3A.

The signal diagram 360 may begin when the mobile electronic device 362 initiates (368) an application stored thereon, where the application may be associated with the retailer. For example, if the retailer is a pharmacy, then the application may be a retailer client application (e.g., an instance of the client application 118) that is offered by the associated pharmacy company and that has been downloaded to the mobile electronic device 362 from a centralized server associated with the pharmacy company, e.g., the server 365 or 202. A user or customer may be electronically associated (370) with the instance of the initiated retailer client application executing on the mobile computing device 362, for example, by generating, storing, and/or accessing electronically stored data linking the user or customer to the instance of the initiated application. Access to the initiated retailer client application may require authentication and/or authorization, e.g., by providing a username/password combination, by providing an account number and/or personal identification number or PIN, or by otherwise being identified as an authorized user of the initiated retailer client application. In an example, authentication and/or authorization of the user or customer may be performed by the initiated retailer client application, by another application executing an electronic device 362, and/or by the server 365.

The electronic device 362 may identify (372) its physical location or environment based on information determined by one or more sensors included in the device 362 and configured to determine information indicative of the device's location. In an implementation, the electronic device 362 may identify its GPS coordinates. In another implementation, the electronic device 362 may detect one or more available WLAN connections each having an associated service set identification (SSID) that identifies the corresponding network and a corresponding location (e.g., a location of a physical retail store of the retailer). In embodiments, the electronic device 362 may automatically connect to an in-store network of the physical retail store, such as when the electronic device 362 has previously stored the SSID of the in-store network. Further, multiple retail stores may maintain consistent SSIDs such that the electronic device 362 may automatically connect to the in-store network of any physical retail store in or near which it is located, even if the electronic device 362 has previously not connected to that in-store network. In a further implementation, the electronic device 362 may connect to an in-store transmitter that has an associated location within the physical retail store. In identifying its location, the electronic device 362 may identify a particular physical retail store in or near which the electronic device 362 may be located, where the retail store may have an identification code (e.g., a unique number). In an embodiment, the electronic device 362 may be configured to continuously monitor its location, and may automatically determine when it is located near or within the retail store. It should be appreciated that additional techniques for determining a location of the electronic device 362 are appreciated.

The electronic device 362 may send (375) an indication of the user or customer and an indication of the electronic device's location or environment to the server 365. It should be appreciated that the electronic device 362 may send (375) the indication of the user or customer and the indication of the location in separate communications, at separate times, and/or the like. For example, the electronic device 362 may first identify its location or environment and send the indication of the location or environment to the server 365, then receive an indication of the user or customer and send said indication to the server 365. Further, the location may be in the form of identifying data, such as an SSID of an in-store WLAN connection, an identification of an in-store transmitter, or an identification of the physical retail store. The server 365 may identify (378), based on the location of the electronic device 362 or other data (e.g., an identification of a transmitter to which the electronic device 362 connects), a particular physical retail store in which the electronic device 362 may be located or to which the electronic device 362 is in proximity. In an implementation, there may be multiple physical retail stores in proximity to the electronic device 362, and the server 365 may identify (378) the physical retail store closest to the electronic device 362.

The server 365 may determine (380) Recently Viewed Items (RVIs) associated with the user or customer, e.g., products or items that were recently viewed or focused on by the user or customer during one or more previous electronic retail store sessions. For example, the server 365 may access the user's global cookie $GC_{userID}$ to determine (380) one or more RVIs from one or more previous electronic retail store sessions of the user.

Based on the determined RVIs of the user or customer, the server 365 may execute one or more queries (382) to identify, access, determine, or obtain information associated with the determined, recently viewed products and/or services that is particular to the identified physical retail store. For example, the server 365 may identify, access, determine, or obtain pricing information of the items within the physical retail store, availability (e.g., available in store or out of stock, quantity available) at the physical retail store, area or location within the store (e.g., aisle 6), product images and/or descriptions, and/or other information, e.g., from the one or more databases 146.

In one implementation, the server 365 may serially or concurrently execute multiple queries in multiple databases that may store different information, where the queries may complete at different or varied times. For example, one database may store product description information, another database may store availability information, and another database may store product location information. The server 365 may further access, identify, or determine (382) any coupon(s) for the relevant products identified from the query. According to embodiments, the server 365 may identify existing coupons for the products, or may dynamically and automatically generate coupon(s) for the products. It should be appreciated that the server 365 may execute the quer(ies) using various techniques, algorithms, or the like, and according to varying degrees of granularity.

The server 365 may send (385), to the electronic device 362, the determined information associated with the RVIs of the user or customer and with the physical retail store, e.g., any information associated with the item(s) or product(s) at the identified physical retail store, and any discount(s), sale(s), and/or coupon(s). It should be appreciated that the server 365 may send any combination of this information, as well as varying amounts of this information, and/or related information. For example, if the user had previously viewed a particular size of dishwashing detergent at the retailer's electronic store, the server 365 may send information about the particular viewed size as well as other sizes of the dishwashing detergent. Further, the server 365 may automatically send the results of the query to the electronic device 362 as the server 365 determines or identifies the information. In particular, the server 365 may serially receive search results from various of the databases to which the server 365 interfaces, and may in turn serially send the received information to the electronic device 362.

The electronic device 362 may automatically display (388) at least some of the information with the RVIs of the user or customer via the retailer client application. In embodiments, the electronic device 362 may display (388) the information via a user interface or other type of display device, where the user may interface with the displayed content to view certain information, make selections, and/or facilitate other functionalities. It should be appreciated that the electronic device 362 may display (388) the information using any ordering technique or convention. For example, the electronic device 362 may prioritize, in the display, coupons that are specific to the physical retail store identified in at reference 378 (e.g., by highlighting these coupons), as compared to coupons that may be accepted at additional retail locations. In some implementations, the identified physical retail store may offer various sponsored products or otherwise products that may be promoted by a manufacturer or distributor, in which case the electronic device 362 may prioritize the display of such sponsored products (e.g., by displaying these products at the top of a list).

It should be further appreciated that the electronic device 362 may display (388) various combinations and types of information. In particular, the electronic device 362 may display images of any RVIs that are identified, their respective locations within the retail store (e.g., an aisle and/or shelf number), prices for the items or products (which may be specific to the identified retail store), inventory information for the items or products at the identified retail store (and optionally, rain checks for sold-out items), descriptions associated with the items or products, and/or other information. In some scenarios, the physical retail store may not have any availability of a particular item or product, in which case the server 365 may identify any nearby physical retail stores that have the item or product available (e.g., using the location of the electronic device 362 and any stored product inventory data), and send the availability information to the electronic device 362, where the electronic device 362 may indicate the nearby physical retail stores and the availability information.

In some implementations, the electronic device 362 may dynamically update the displayed information, such as if the electronic device 362 receives new or updated product-related information from the server 365. For example, after initially sending the information in (385), the server 365 may identify or generate a coupon associated with an identified product, and send the coupon to the electronic device 362, where the electronic device 362 may update the display to indicate the coupon. For further example, the electronic device 362 may dynamically update inventory information for a particular product, such as if additional inventory is detected or if another customer purchases the particular product. Further, for example, the electronic device 362 may dynamically update the display to indicate new or updated product-related information as it is received from the server 365. In embodiments, the electronic device 362 may re-prioritize the display based on various priority rules, more relevant identified products, or other metrics. It should be appreciated that the electronic device 362 may dynamically update the displayed information in other various ways.

The electronic device 362 may receive (390) a selection of a displayed product. In particular, the user may directly select the product via the user interface. The electronic device 362 may display (392) any information associated with the product. According to embodiments, the electronic device 362 may display image(s) of the product, a location within the retail store (e.g., an aisle and/or shelf number), a price for the product (which may be specific to the identified retail store), an inventory for the item at the identified retail store, a description associated with the item, and/or other information. Accordingly, the user is able to efficiently and effectively locate the item with the physical retail store and view information associated with the item, among other benefits.

The electronic device 362 may receive (395) a selection of a coupon, such as a coupon displayed in a user interface and/or associated with an item displayed in the user interface. In particular, the user may select to "clip" the coupon or otherwise redeem the coupon. In response to receiving the selection of the coupon, the electronic device 362 may update (398) account information of the user to reflect the selected coupon. In this regard, when the user checks out at a point of sale (POS) terminal and enters his/her account identification (e.g., an account number), the discount associated with the coupon may be applied to the transaction. Accordingly, the user is afforded an efficient and effective way to redeem coupons and apply them to an account.

Figure 4:
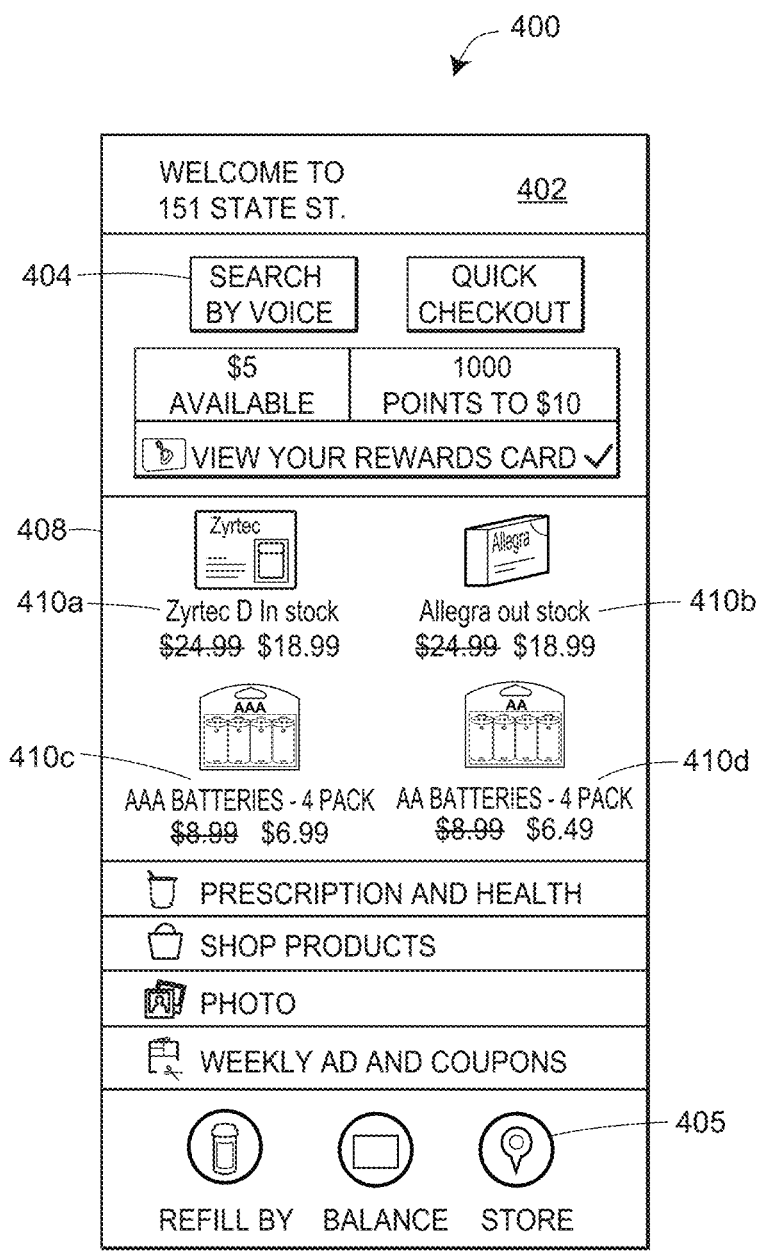
FIGS. 4-5 depict exemplary user interfaces associated with an application that supports seamless user retail experiences, in accordance with some embodiments.
Figure 5:
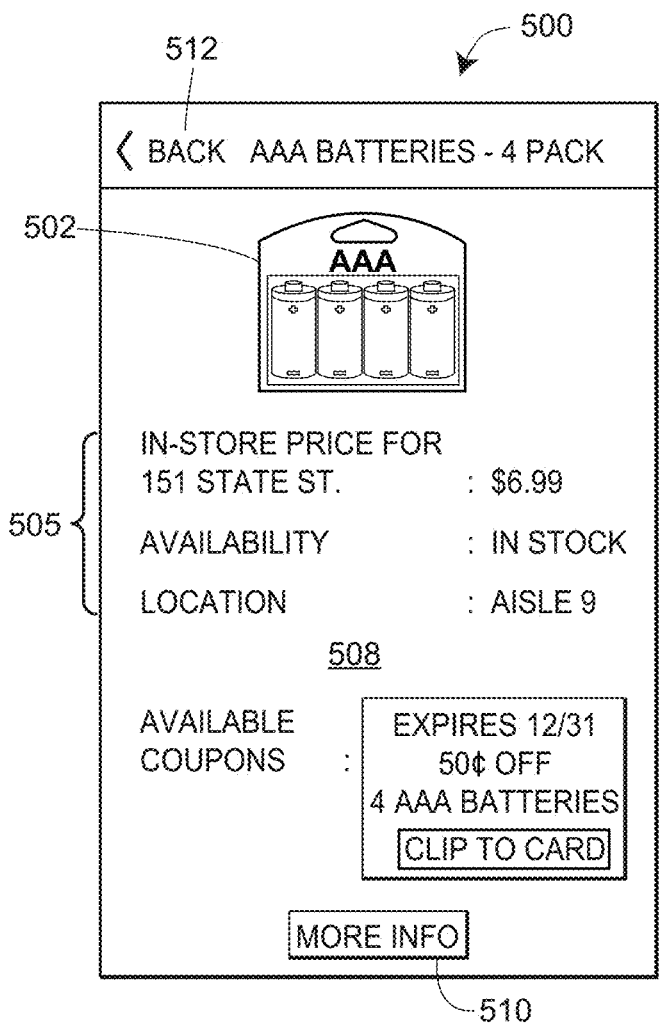

FIGS. 4-5 depict example interfaces associated with the described embodiments. An electronic device (such as the electronic device 362 as described with respect to FIG. 3) may be configured to display the example interfaces via a user interface. In an implementation, the example interfaces may be associated with a dedicated application, for example an application offered for download by a retailer. Each of the example interfaces may enable a user of the electronic device to make selections, input data or information, and generally facilitate operation of the functionalities indicated in the example interfaces. It should be appreciated that the graphical content of the example interfaces is exemplary, and that the example interfaces may include alternate, additional, and fewer graphical content.

FIG. 4 depicts an example interface 400 of a retailer client application (such as the application 118 of FIGS. 1A and 1B, or the retailer client application that was initiated at reference 368 of FIG. 3B) executing on an electronic device. The interface 400 of the retailer client application depicts various functionalities that may be facilitated by a user of the electronic device. For example, as shown in FIG. 4, the functionalities may include, inter alia, viewing prescription and health data, shopping for products, searching for products (e.g., by data entry and/or by voice), ordering photos, browsing a weekly ad and coupons, viewing refill information, and viewing rewards card information of a retailer.

The interface 400 may indicate a physical retail store 402 of the retailer (e.g., by displaying an address of the retail store 402) that may be in proximity to the electronic device, such as if the electronic device is located within the physical retail store 402, or if the physical retail store 402 is the physical store location closest to the electronic device. As discussed herein, the electronic device may identify the physical retail store 402 via a geo-location technique, or other techniques. The interface 400 may include a store selection 405 that may enable the user to select another physical retail store location, if desired.

According to embodiments, the interface 400 may include a portion 408 in which indications of one or more items 410a-410d (generally referred to herein as the reference 410x) that were previously viewed or focused on by the user or customer during one or more sessions at the retailer's electronic retail store (e.g., RVIs), along with associated information that is particular to each RVI 410x at the physical retail store 402. For example, an indication of whether or not a particular RVI 410x is in stock at the physical retail store 402 and/or a price of the particular RVI 410x at the physical retail store 402 may be displayed in the interface portion 408. The information presented in the portion 408 of the interface 400 may be automatically displayed based on the identified physical retail store 402, e.g., in a manner such as previously discussed. The interface 400 may receive a user selection of one of the items 410x displayed in the portion 408 and, based on the selection, another interface presenting details of the selected item or product may be displayed at the electronic device.

FIG. 5 illustrates an example interface 500 that details information associated with a product selected via the interface 400 of FIG. 4. In particular, the electronic device may display the interface 500 in response to receiving a selection of the product 410c that is indicated in the portion 408 of the interface 400. The interface 500 may include various information associated with the selected product, including one or more images 502 and a set of additional information 505. As shown in FIG. 5, the set of additional information 505 may include an in-store price for the product (i.e., a price specific to that particular retail location), an availability (which may be in the form of "in stock," "out of stock," or an inventory amount), and a location where the product may be found within the store. The interface 505 may also detail a set of available coupons 508 for the product, where the user may select to "clip" any of the coupons 508 to an account of the user. Further, the interface 500 may include a "more info" selection 510 that may cause the electronic device to access and display more information associated with the product, which may include a link to the product at the electronic retail store of the retailer, in an embodiment.

Still further, the interface 500 may include a "back" control 512 that enables the user to return to the interface 400, if desired.

Figure 6:
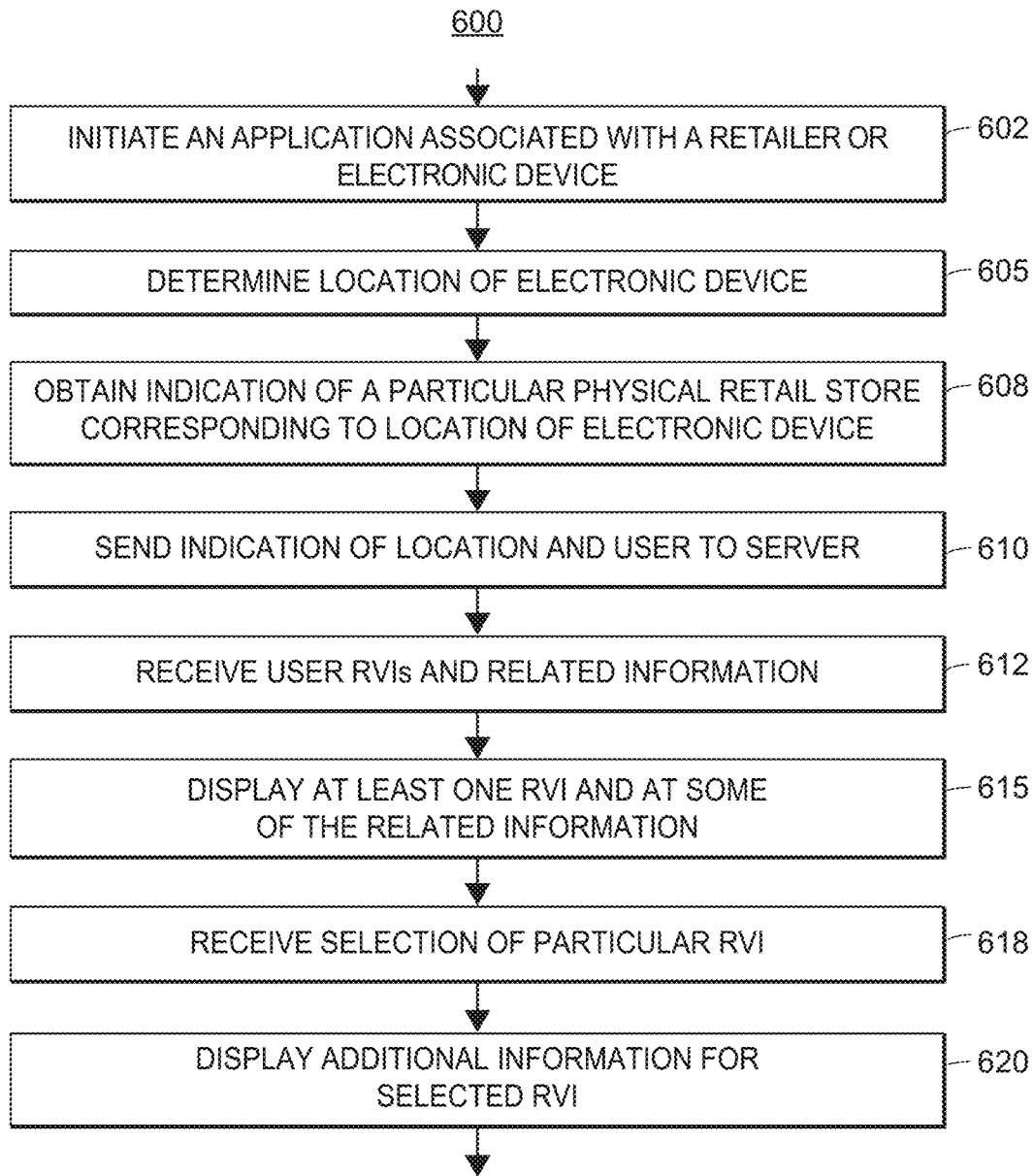
FIG. 6 depicts a flow chart of an example method for providing a seamless retail experience for user, in accordance with some embodiments.

FIG. 6 is a flow chart of an example method 600 of providing a seamless retail experience across electronic and physical retail stores of a retailer. The method 600 may operate in conjunction with embodiments of the system 100 of FIGS. 1A-1D, the physical retail store 272 of FIG. 2, the signal diagrams 300, 360 of FIGS. 3A-3B, and/or the interfaces 400, 500 of FIGS. 4-5, or other systems, stores, signal diagrams, and/or interfaces. For ease of discussion, and not for limitation purposes, the method 600 is discussed with simultaneous reference to FIGS. 1A-1D, FIG. 2, FIGS. 3A-3B, and FIGS. 4-5.

The method 600 may be performed by an electronic device that supports an application associated with a retailer. For example, the application associated with the retailer may be a browser, a retailer client application, or another application executing on the electronic device, such as the application 118. The application may be configured to communicate with one or more servers such as the backend server 202, another backend component 104 of the retailer, and/or a server within a physical retail store of the retailer, such as the facility server 126. For ease of discussion, the method 600 is described herein with respect to "a server" (singular), although it is understood that the method 600 may operate with any number of one or more servers, e.g., two servers, five servers, or even all servers within the retailer system 100. It should be appreciated that the method 600 is merely exemplary and may include alternative or additional functionalities.

The method 600 may include initiating (block 602) the application associated with the retailer. In embodiments, a user of the electronic device may select to initiate the application, or the electronic device may automatically initiate the application in response to a certain trigger (e.g., connecting to an in-store network of the retailer). At any rate, the application may be associated (e.g., electronically associated) both with a user and a retailer that operates an electronic retail store and at least one physical retail store. For example, the application may be a retailer client application which has been downloaded from the retailer's server to the electronic device and which has been electronically associated with the user by a login/password, an account number, an access code or PIN, or some other suitable electronic indication of an association between the user and the retailer client application.

The method 600 may include determining (block 605) a location or environment of the electronic device based on one or more sensors of the electronic device, such as one or more GPS sensors and/or other wireless communication transceivers included in the electronic device. For example, based on information detected by the one or more sensors (e.g., GPS coordinates, network identifiers, service set identification identifiers, other types of identification codes, and/or the like), the location of the electronic device may be determined (block 605). In an implementation, the electronic device may determine its location (e.g., via a location module), and one or more retailer servers (or the electronic device) may identify a corresponding physical retail store based on the determined location. In another implementation, the electronic device may connect to an in-store transmitter or an in-store network and may identify the physical retail store based on the connection. At any rate, the method 600 may include obtaining an indication of a physical retail store corresponding to the location of the electronic device (block 608).

In an embodiment, the method 600 may include sending, to the server, an indication of location of the electronic device (e.g., GPS coordinates, network identifiers, service set identifiers, identification code, store number, etc.), and an indication of the user (e.g., account number, user name/login, etc.) (block 610). The method 600 may include receiving, from the server, respective indications of one or more products or items that were previously viewed and/or focused on by the user at the retailer's electronics store during one or more sessions or visits of the user at the retailer's electronic store (e.g., Recently Viewed Items or RVIs), and receiving respective related information corresponding to both the RVIs and the physical retail store (block 612). As previously discussed, different RVIs may have been viewed during different sessions. For example, the received information may include a name or identifier of a recently-viewed product, an image of the product, its price at the physical retail store, an area or location within the physical retail store where the product may be found, the availability and/or inventory of the product at the physical retail store, indications of sales, coupons, or discounts for the product at the physical retail store, and/or information corresponding to related products. In an implementation, the product may be not be available at the identified physical retail store, in which case the information related to the product may indicate an additional retail store (whether physical and/or electronic) at which the at least one product is available, and may display, at the user interface of the electronic device, an indication of the product at the additional retail store. For example, e.g., if the additional retail store is the electronic retail store, the displayed information may include a link to the product, pricing, availability, etc. at the electronic retail store. In an embodiment, the method 600 may include receiving, from the server, an indication of the physical retail store, where the physical retail store is determined based on the location of electronic device.

The method 600 may include displaying, on the user interface of the electronic device via the application, respective indications of one or more RVIs and at least some of the information related or particular to the indicated RVIs at the physical retail store (block 615). For example, images of the RVI products, their respective prices, and optionally their respective availabilities at the physical retail store may be automatically displayed in a particular area of the user interface, e.g., the additional information may include as the information is received from the server.

The method 600 may include receiving, via the user interface electronic device, an indication of a user selection of a particular one of the displayed RVIs (block 618). Based on the user selection, additional information related to the selected RVI may be presented at the user interface of the electronic device (block 620). The additional information may include, for example, an area or location within the physical retail store at which the particular product may be found, available coupons or rebates for the product, and/or other information that is particular to the selected product and to the physical retail store. In an embodiment, a link to the selected RVI product at the electronic retail store of the retailer may be provided, thereby providing still additional seamlessness in the user's retail experience.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A system, comprising:
one or more centralized data storage devices storing information corresponding to one or more user accounts associated with a retailer; and
one or more processors interfacing with the one or more centralized data storage devices and in communicative connection with an application executing on an electronic device, the application corresponding to the retailer and to an account of a user associated with the retailer, and the one or more processors configured to:
obtain, from the one or more centralized data storage devices, information corresponding to one or more products previously viewed by the user at an electronic retail store of the retailer and particular to a physical retail store determined based a location of the electronic device;
transmit the obtained information to the application for display on a user interface of the electronic device, and
for each product included in the one or more products that were previously viewed by the user at the electronic retail store, upon elapse of a predetermined amount of time since the user last viewed or focused on the previously viewed each product, delete a respective indication of the previously viewed each product from the one or more centralized data storage devices.

2. The system of claim 1, further comprising a global cookie stored in the one or more centralized data storage devices, the global cookie that is associated with the account of the user and that includes contents which indicate the one or more products previously viewed by the user at the electronic retail store.

3. The system of claim 2, wherein at least some of the contents of the global cookie are based on contents of a local cookie of a temporary session during which the user viewed the one or more products at the electronic retail store.

4. The system of claim 3, wherein:
the contents of the local cookie are based on at least one of: a shopping cart of the user the electronic retail store, a wish list of the user stored at the electronic retail store, a user search at the electronic retail store, a user selection at the electronic retail store, or a user focus event at the electronic retail store;
the contents of the local cookie are deleted when the temporary session is torn down; and
the at least some of the contents of the global cookie are persisted when the temporary session is torn down.

5. The system of claim 1, wherein the information corresponding to the previously viewed one or more products and particular to the physical retail store comprises at least one of: respective prices of the one or more products at the physical retail store, respective areas or locations within the physical retail store at which the one or more products are located, respective availabilities of the one or more products at the physical retail store, or a coupon or discount for at least some of the one or more products at the physical retail store.

6. The system of claim 1, wherein the one or more products previously viewed by the user at the electronic retail store of the retailer includes multiple products previously viewed by the user at the electronic retail store during different sessions at the electronic retail store.

7. The system of claim 1, wherein the one or more processors are further configured to determine the location of the electronic device and an identity of the physical retail store.

8. The system of claim 1, wherein the one or more processors are further configured to:
receive, from the electronic device, respective indications of at least one product that was viewed and/or focused on by the user via the application at the electronic device; and
store the respective indications of the at least one product that was viewed and/or focused on by the user via the application at the electronic device at the one or more centralized data storage devices.

9. The system of claim 8, wherein:
the at least one product was viewed and/or focused on by the user via the application at the electronic device during a session;
the reception of the respective indications of the at least one product that was viewed and/or focused on by the user during the session is based on an initiation of a termination of the session; and
the storage of the respective indications of the at least one product that was viewed and/or focused on by the user during the session is persisted in the one or more centralized data storage devices after the session has been terminated.

10. The system of claim 1, wherein the one or more processors are configured further to:
obtain updated information corresponding to the one or more products previously viewed by the user at the electronic retail store and particular to the physical retail store; and
transmit the updated information to the application for updating the display on the user interface of the electronic device.

11. A computer-implemented method for providing a seamless retail experience, the method comprising:
obtaining, by one or more processors from one or more centralized data storage devices storing information corresponding to one or more user accounts associated with a retailer, information corresponding to one or more products previously viewed by a user at an electronic retail store of the retailer and particular to a physical retail store of the retailer, the physical retail store determined based a location of an electronic device associated with the user;
transmitting, by the one or more processors to an application executing on the electronic device, the obtained information for display on a user interface of the electronic device, the application corresponding to the retailer and to an account of the user associated with the retailer; and
for each product included in the one or more products that were previously viewed by the user at the electronic retail store, upon elapse of a predetermined amount of time since the user last viewed or focused on the each previously viewed each product, deleting, by the one or more processors, a respective indication of the each previously viewed each product from the one or more centralized data storage devices.

12. The method of claim 11, further comprising storing, by the one or more processors, respective indications of the one or more products previously viewed by the user at the electronic retail store in a global cookie stored in the one or more centralized data storage devices, the global cookie associated with the account of the user.

13. The method of claim 12, wherein at least some contents of the global cookie are based on contents of a local cookie of a temporary session during which the user viewed the one or more products at the electronic retail store of the retailer.

14. The method of claim 13, wherein:
the contents of the local cookie are based on at least one of: a shopping cart of the user the electronic retail store, a wish list of the user stored at the electronic retail store, a user search at the electronic retail store, a user selection at the electronic retail store, or a user focus event at the electronic retail store; and
the method further comprises persisting, in the contents of the global cookie after the temporary session has been torn down, respective indications of products indicated by the contents of the local cookie.

15. The method of claim 11, wherein obtaining the information corresponding to the previously viewed one or more products and particular to the physical retail store comprises obtaining at least one of: respective prices of the one or more products at the physical retail store, respective areas or locations within the physical retail store at which the one or more products are located, respective availabilities of the one or more products at the physical retail store, or a coupon or discount for at least some of the one or more products at the physical retail store.

16. The method of claim 11, wherein obtaining the information corresponding to the one or more products previously viewed by the user at the electronic retail store of the retailer includes obtaining respective information corresponding to multiple products previously viewed by the user at the electronic retail store during different sessions at the electronic retail store.

17. The method of claim 11, further comprising determining, by the one or more processors, the location of the electronic device and an identity of the physical retail store.

18. The method of claim 11, further comprising:
receiving, from the electronic device, respective indications of at least one product that was viewed and/or focused on by the user via the application at the electronic device; and
storing, by the one or more processors, the respective indications of the at least one product that was viewed and/or focused on by the user via the application at the electronic device at the one or more centralized data storage devices.

19. The method of claim 18, wherein:
the at least one product was viewed and/or focused on by the user via the application at the electronic device during a session;
receiving the respective indications of the at least one product that was viewed and/or focused on by the user via the application at the electronic device during the session is based on an initiation of a termination of the session; and
the method further comprises persisting the respective indications of the at least one product that was viewed and/or focused on by the user during the session in the one or more centralized data storage devices after the session has been terminated.

20. The method of claim 11, further comprising:
obtaining, by the one or more processors, updated information corresponding to the one or more products previously viewed by the user at the electronic retail store and particular to the physical retail store; and
transmitting, by the one or more processors, the updated information to the application for updating the display on the user interface of the electronic device.

* * * * *